Patented Mar. 6, 1951

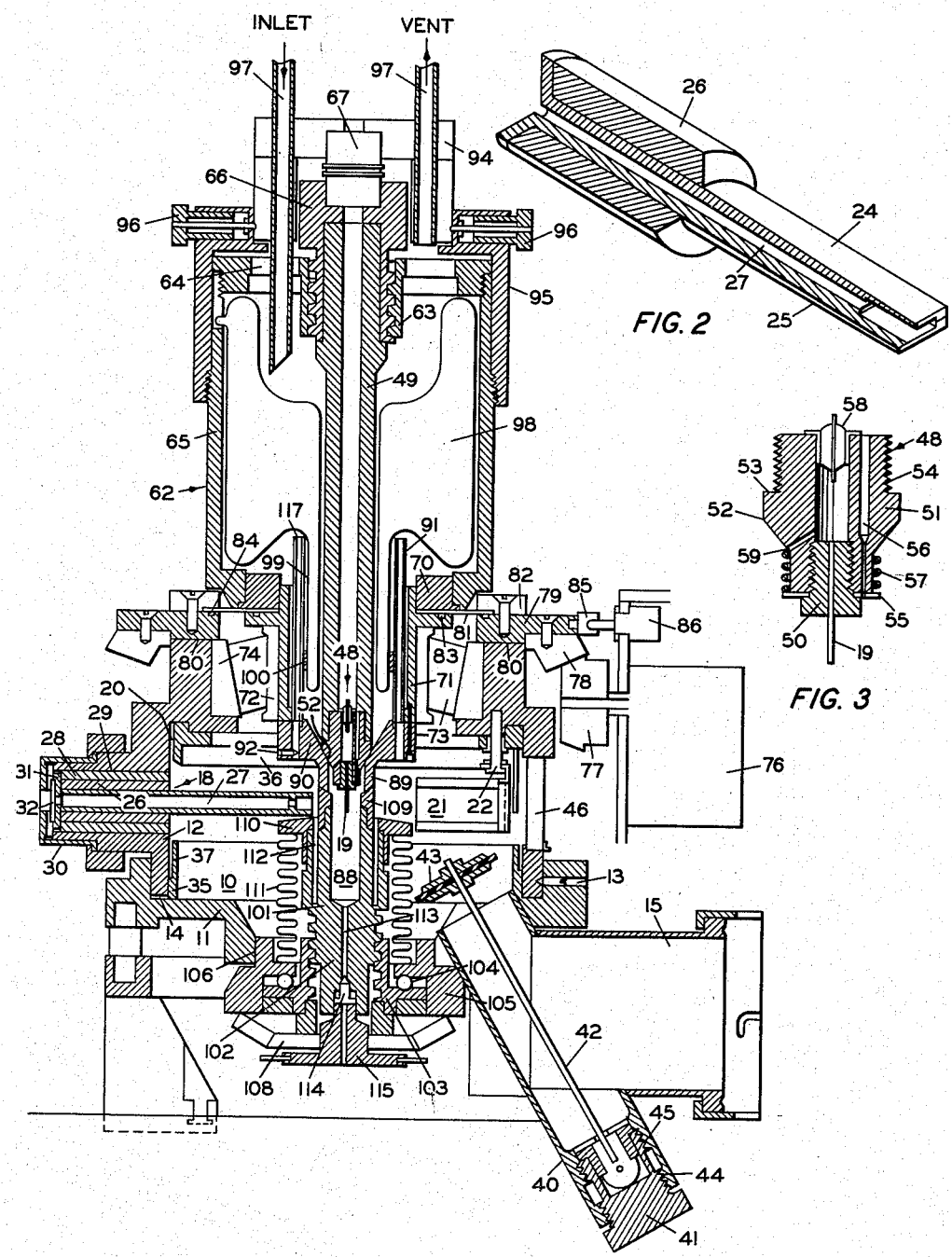

2,543,825

UNITED STATES PATENT OFFICE 2,543,825

X-RAY DIFFRACTION APPARATUS

Karl E. Beu, Bartlesville, and Howard H. Claassen, Norman, Okla., assignors to Phillips Petroleum Company, a corporation of Delaware Application April 26, 1948, Serial No. 23,234

9 Claims. (Cl. 250—53)

This invention relates to X-ray diffraction apparatus. In one more specific embodiment, it relates to such apparatus embodying cooling means for transforming a normally liquid or gaseous substance into a frozen crystalline state for X-ray analysis thereof.

Heretofore, X-ray machines have been commonly used to obtain diffraction patterns of crystalline materials and thereby determine the crystal structure thereof. When such apparatus is used with substances which are liquid or gaseous at room temperature, and hence have no crystalline structure, it is necessary to cool the specimen below its freezing point in order to obtain the material in crystalline form suitable for examination by the X-ray diffraction apparatus. Many attempts and proposals have been made to devise satisfactory apparatus for use under such conditions but none of these has been completely successful on a practical and commercial scale due to the difficulties enountered in maintaining a constant low temperature in the specimen holder and in freezing the specimen rapidly to obtain small crystals. Other difficulties are encountered as a result of leaks at the vacuum seals in the X-ray chamber and fogging of the film due to leakage of light into the chamber.

In accordance with our invention, an X-ray chamber is provided which may be evacuated in the usual manner to permit an X-ray diffraction photograph to be taken of the material under test. Prior to the time that the X-ray apparatus is operated, a supply of cooling fluid is introduced into a localized area contiguous to the specimen holder, thereby rapidly freezing the specimen to provide the necessary crystal structure for X-ray examination. This result may be advantageously accomplished by providing an inner chamber or subchamber within the main X-ray chamber into which a cooling fluid, such as liquid nitrogen, is introduced to rapidly decrease the temperature of the specimen. This chamber is preferably formed by engagement of two relatively movable members which surround the specimen holder and define a sealed region adjacent thereto. In order to prevent interference with the X-ray beam by the subchamber walls, we provide for the disengagement of said members after the specimen has been cooled to the desired degree but before the X-ray photograph is taken. It is a feature of the invention that a thermocouple and heater are provided adjacent the specimen holder to obtain close control of specimen temperature while the actual photograph is taken. Further in accordance with the invention, novel means are provided for hermetically sealing the X-ray chamber and for preventing light from entering the chamber after the film has been exposed. Provision is also desirably made for rotation of the specimen holder assembly while the film is being exposed to reinforce the diffraction pattern obtained from the impingement of the X-ray beam upon the specimen.

Accordingly, it is an object of the invention to provide improved apparatus for obtaining an X-ray diffraction photograph of a specimen which is maintained at low temperature.

It is a further object of the invention to provide an X-ray diffraction camera in which a subchamber or inner chamber is provided within the main X-ray apparatus into which cooling fluid may be introduced for quickly freezing a specimen under test.

It is a still further object of the invention to provide such an X-ray diffraction apparatus which is of simple construction, rugged, durable, and economical to build and adjust.

Various other objects, advantages and features of the invention will become apparent from the following detailed description taken in conjunction with the accompanying drawings, in which:

Figure 1 is a sectional view of the novel X-ray diffraction apparatus;

Figure 2 is a detail view of the X-ray slit assembly; and

Figure 3 is a detail view of the specimen holder.

Referring now to the drawings in detail, the apparatus comprises a generally cylindrical main X-ray chamber 10 defined by a base 11 and a housing 12 which is secured to the base by alignment screws, as at 13, a vacuum seal between these parts being provided by a gasket 14. The chamber 10 may be hermetically sealed in the manner hereinafter described and it may be exhausted by a suitable suction line secured to a port 15 communicating with the interior of the chamber.

Mounted in the chamber 10 is a guide or slit assembly 18 which directs a beam of X-rays against a specimen contained within a holder 19, this specimen reflecting a part of the X-ray beam in such fashion as to form a diffraction pattern upon a film 20 which is held against the inner arcuate portion of the housing 12. The part of the beam which is not reflected by the specimen is absorbed by a beam stop 21 to prevent fogging of the film, the stop being supported interiorly of the chamber 10 by a screw 22. As will become apparent from the following description, when the X-ray apparatus is energized, the parts are in such position as to provide a clear unobstructed path between the inner end of the slit assembly, the specimen, the beam stop, and the film.

The slit assembly, as shown in detail by Figure 2, comprises a pair of flat members 24, 25 which are held together by a sleeve 26 and define a longitudinally-extending slit 27. As shown, the members 24, 25 are tapered, thereby providing a relatively thin forward edge which permits diffraction patterns to register on the film at large angles.

Referring again to Figure 1, an outer liner 28 is superposed upon the sleeve 26 and this liner fits into a complementary recessed portion 29 formed in the housing 12. The assembly is secured within the recessed portion 29 by an apertured cap 30 which is screw threaded on the housing 12 and an apertured gasket 31 is provided for sealing the outer end of the slit assembly. A beryllium disc or window 32 is disposed between the cap 30 and the gasket, this window being transparent to X-rays but effectively preventing the entrance of air and light into the chamber 10 and resultant fogging of the film. The disc 32 also seals the apertured portions of the cap and gasket. It will be apparent that, when a source of X-rays is placed adjacent the aperture in cap 30, a beam will be directed against the specimen in holder 19 thereby impressing a diffraction pattern upon the film 20.

In order that the film may be readily inserted and removed, we provide a film support comprising a metal ring 35 which rests upon the base 11 and an annular member 36 which is supported at the top of the chamber by the screw 22. The ring 35 has a flanged portion 37 which, together with the adjacent surface of the housing, defines a narrow slot for receiving the lower end of the film while the member 36 is of such dimensions as to define a narrow slot with the adjacent surface of the housing for receiving the upper end of the film. This structure provides a support which positively holds the film in position, let the film may be readily inserted into the holder or removed therefrom.

After the film is exposed, it is oftentimes desirable to disconnect the X-ray generator and suction line so that the apparatus may be moved into a darkroom for removal of the film. In such cases, it is necessary to prevent light from entering through port 15 and fogging the film. To this end, we provide an exhaust tube 40 communicating with the port 15 and chamber 10, this tube being provided with a threaded nut 41 carrying a rod 42 which, in turn, carries a cap 43, this cap being engageable with the inner end of the tube 40. Two sets of threads 44, 45 are provided on the nut 41 and, when threads 44 engage mating threads formed interiorly of the tube 40, a seal is effected at the threaded joint and the cap 43 protrudes inwardly of the chamber, as shown. The interior of the chamber may then be exhausted through port 15 in the usual manner. When it is desired to restore normal air pressure within the chamber, the nut 41 is moved outwardly to disengage threads 44 and permit air to enter the chamber through tube 40. Thereafter, the nut 41 is again moved outwardly until threads 45 are engaged, thereby causing the cap 43 to fit against the inner end of the tube 40. This prevents light from entering the chamber 10 through the port 15 when the suction line is disconnected therefrom and the apparatus may then be moved into a darkroom without fogging the film.

We also provide windows, one of which is shown at 46, for observing the interior of the chamber 10. These windows may be covered with suitable plugs to exclude light when the apparatus is in use.

The specimen holder 19 preferably comprises a beryllium tube, the interior of which is of capillary dimensions so that a small quantity of liquid may be retained therein by capillary action. The tube may thus be used many times by pushing or blowing one specimen through the tube and replacing it by another. Beryllium is the preferred material for the tube due to its transparency to X-rays and the fact that it is insoluble in hydrocarbon specimens. In addition, the beryllium tube conducts heat away from the specimen rapidly, enabling a low specimen temperature to be maintained. Such a tube may be advantageously formed by depositing beryllium vapors in a vacuum upon a rotating copper rod of small dimensions. Thereafter, the copper rod may be dissolved by a suitable etching reagent, such as nitric acid, which will attack the copper but not the beryllium. The preferred dimensions for the tube are a diameter of about 0.5 mm. and a wall thickness of about 0.01 mm.

The specimen holder or tube 19 is held by an assembly 48 which is screw threaded into a tubular member 49. As shown in detail by Figure 3, the assembly 48 comprises a nut 50 having a central passage into which the tube 19 is soldered. The nut 50, in turn, is screw threaded to a generally cylindrical member 51, having a frustro-conical portion 52 together with a shoulder 53 and threads 54 by which it is secured to the end of the tube 49.

A thermocouple 55 is positioned at the lower end of the member 51, one terminal of the thermocouple being connected to said member and the other terminal having a lead, not shown, connected thereto which extends through a bore 56. A heater coil 57 is wound around the lower end of the member 51, this coil having one terminal connected to a lead, not shown, which extends through a glass bead insulator 58, this insulator also forming a vacuum seal for the specimen holder assembly. The other heater terminal has a lead, not shown, extending through a bore 59 in the member 51. Thus, the thermocouple indicates the temperature in the region of the specimen and the heater coil may be used to raise the temperature if it becomes too low.

The tube 49 which carries the specimen holder unit 48 forms a part of a rotatable assembly 62 and the tube is movable axially with respect to this assembly by virtue of a threaded connection 63 between the tube and a perforated annular nut member 64 secured to a cylindrical housing 65. Thus, rotation of the tube by a knob 66 secured thereto causes it to move longitudinally of the housing 65 and assembly 62. The knob has an internal passage communicating with the passage in tube 49 and a Jones type connector plug 67 is seated in this passage. The leads previously described for making connection to the heater and thermocouple in specimen holder assembly 48 extend through the tube 49 and terminate at plug 67, thereby affording convenient electrical connections for these parts.

The assembly 62 carrying the specimen holder 19 is rotatable as a unit, such rotation of the specimen while the X-ray device is energized being effective to improve the uniformity of the diffraction pattern registered on the film, as those skilled in the art will understand. A metal ring 70 is screw threaded to the bottom of the housing 65 and a sleeve 71 is screw threaded to the ring 70, this sleeve carrying a bearing race 72 which cooperates with roller bearings 73 and a bearing race 74 on the housing 12. Rotation of the assembly 62 and specimen holder 19 upon the bearings 73 is effected by a motor 76 which drives a gear 77 meshing with a ring gear 78 secured to an annular metal plate 79. This plate is slidably supported upon the housing 12 by a grease joint at 80 which forms a vacuum seal between these parts.

A driving connection is effected between the annular member 79 and the rotatable assembly 62 by a sheet 81 of thin shim stock, this sheet being secured at one end thereof between a clamping member 82 and the annular member 79, while, at the other end thereof, the sheet 81 is secured between a flanged portion of the sleeve 71 and the ring 70. A pair of gaskets 83, 84 provide a vacuum seal for the shim 81 at the respective inner and outer surfaces thereof. It will be apparent that, when the motor 76 is operated, ring gear 78 and plate 79 are rotated thereby rotating the assembly 62 and the specimen holder 19 through shim 81. It will be noted that the shim 81 provides vertical compliance between the assembly 62 and the lower part of the apparatus, thereby overcoming alignment problems in assembly.

As an optional feature, we provide means for reversing the direction of motor rotation each 360° of motor revolution. To this end, a tooth 85 is provided upon the periphery of the annular member 79 and this tooth actuates a switch 86 each time the annular member 79 makes a complete revolution. The switch is connected to the motor in a suitable circuit so that the direction of motor rotation is reversed each time the switch is actuated. This feature is desirable to prevent twisting of the leads connecting the thermocouple and heater on specimen holder assembly 48 to the respective current sources and control means therefor.

In accordance with the invention, we provide means for introducing cooling fluid into a localized area adjacent the specimen holder thereby to rapidly cool and freeze the specimen without the necessity for reducing the temperature of the entire X-ray chamber. This means preferably and advantageously comprises a subchamber 88 surrounding the specimen holder into which a cooling fluid, such as liquid nitrogen, may be introduced to quickly freeze the specimen. In the example shown, the upper part of subchamber 88 is defined by a cylindrical or sleeve member 89, preferably formed from brass, and having a frustro-conical upper end portion 90. This sleeve is supported by a double walled metal tube 91 which is carried by the member 71 and has its inner surface spaced from the tube 49. The upper end 90 of sleeve 89 engages the lower part of the tube 91 and is positively retained in position by a set screw 92 mounted at the lower extremity of the member 71. For a purpose to be hereinafter explained, the portion 52 of the specimen holder assembly 48 is adapted to seat against the frustro-conical portion 90 and form a vacuum tight seal therewith when the tube 49 is moved to its lowermost position by adjustment of the knob 66.

In order to rapidly and quickly freeze a specimen contained in the holder 19, a cooling fluid, such as liquid nitrogen, is introduced into the assembly 62 and, thence, into the subchamber 88. To this end, a closure member 94 is detachably supported upon a cap 95 by detents 96, the cap 95 being force fitted upon the housing 65 and, together with the closure member 94, preventing moisture from entering at the top of the housing 65. Closure member 94 is provided with openings 97 through which cooling fluid may be introduced into the upper part of the chamber defined by the housing 65. A Dewar type vacuum flask 98 is mounted within the housing 65 and has a downwardly protruding part 99 extending into the interspace between the metal tube 91 and the tube 49. A lead seal 100 may be provided between the part 99 and the tube 91 to prevent coolant fluid from leaking into the lower portion of the housing 65. As those skilled in the art will understand, the flask 98 is evacuated and provides heat insulation between the tube 49 and the housing 65. In this connection, it may also be noted that the double walled metal tube 91 provides additional heat insulation between the tube 49 and the sleeve 71. It will be apparent that cooling fluid introduced through the openings 97 will flow downwardly through the interspace between the flask portion 99 and the tube 49 thereby cooling the lower portion of said tube adjacent the specimen holder. With the parts in the position shown, a seal is effected at 52 between the specimen holder assembly 48 and the frustro-conical portion 90 so that no fluid flows into the subchamber 88.

The lower portion of the subchamber 88 is defined by a generally cup shaped member 101 having a threaded shank 102 which is engageable with corresponding threads provided upon a bearing block 103. This block is rotatably mounted by roller bearings 104 in an insert 105 which fits into a complementary recess formed at the bottom of base 11, an air tight seal between the base and insert 105 being provided by a grease seal 106. The bearing block 103 has a gear 108 secured thereto which may be rotated by any suitable apparatus, not shown, or by hand. Such rotation of the gear 108 causes a corresponding rotation of bearing block 103 which results in axial movement of the cup shaped member 101.

Mounted at the top of the cup shaped member 101 is a brass ring 109 which is engageable with the lower end of sleeve 89 to form a sealed joint therewith. When the parts are in the position shown, that is, when sealing ring 109 is engaged with the sleeve 89, it will be apparent that the cup shaped member 101, sleeve 89, and the lower portion of specimen holder assembly 49 define the sealed subchamber 88 which is of smaller dimensions than the main X-ray chamber 10, this subchamber completely surrounding the specimen contained in the holder 19. Also mounted at the top of the cup shaped member 101 is a cap 110 to which is secured one end of a bellows 111, the other end of the bellows being secured, in any suitable manner, to the insert 105. This bellows effectively seals the lower portion of subchamber 88 and prevents the admission of air into the main chamber 10 through the gearing at 103 or through the bearing structure at 104, while still allowing axial movement of the cup shaped member 101. A circumferential slit 112 may be provided in the cap 110 and cup 101 to provide heat insulation between the subchamber 88 and main chamber 10.

The shank portion 102 has a small axial passage 113 which communicates with subchamber 88 and leads to a needle valve 114 which is supported by an assembly 115. This needle valve may be actuated manually to permit excess cooling fluid to drain from the subchamber 88 or it may be actuated automatically to permit the escape of cooling fluid from the subchamber should the pressure therein raise to an excessive value. Assuming that a supply of cooling fluid is inserted into the assembly 62 and fills the interspace between the flask portion 99 and tube 49, it will be apparent this fluid may be admitted into subchamber 88 by raising the tube 49 thereby to disengage the portion 52 of the specimen holder assembly from the frustro-conical portion 90. Further, the cup shaped member 101 together with the attached sealing member 109 is movable downwardly by gear 108 to move these parts out of the path of the X-ray beam projected from the slit assembly 18.

It will be apparent that the main chamber 10 is effectively hermetically sealed when the threads 44 of nut member 41 are engaged to seal the exhaust passage to the chamber. Thus, the bellows 111 seals the area between cap member 110 and insert 105, the grease seal 106 provides a vacuum tight juncture between insert 105 and the base 11, gasket 14 provides a seal between the housing 12 and base 11, and grease seal 80 provides a vacuum tight joint between the annular member 79 and housing 12. In addition, the gaskets 83, 84 and shim 81 seal the area between the sleeve 71 and annular member 79 while the gasket 31 and beryllium disc 32 seal the opening through which the X-ray beam is projected into the chamber. Finally, the engagement of the specimen holder assembly and annular portion 90 at 52 seals the interior of sleeve 89 while a sealing member 117 and the tube 91 seal the interspace between the inner sleeve 89 and outer sleeve 71.

It is a further feature of the invention that light is completely excluded from the chamber 10 after the diffraction image has been impressed upon the film. Thus, when the suction line is released from port 15, the cap 43 prevents light from entering from tube 40, the beryllium window 32 prevents light from entering the chamber through the slit assembly 18 and the plugs provided for windows 46 prevent light from entering therethrough. Accordingly, there is no danger of fogging of the film after the exposure has been made due to the entrance of light into the chamber.

The described apparatus also provides effective heat insulation between the cooled parts thereof and the exterior portions of the assembly. Thus, the area surrounding tube 49 is effectively heat insulated by the Dewar type flask 98 and the double walled steel tube 117 while the lower portions of the chamber are effectively heat insulated by the slits 112 provided in the cup shaped member 101. This leads to a very efficient utilization of cooling fluid and a rapid freezing of the specimen with resultant advantages in that the crystal size is extremely small and the specimen is in an ideal condition for X-ray examination.

The operation of the disclosed apparatus will now be apparent to those skilled in the art. Assuming that a film 20 is inserted in the film holder 35 and 36, a source of X-rays is placed adjacent the opening in cap member 30 and a suction line is attached to port 15 so that exhaustion of the main chamber 10 may be commenced, it being understood that the exhaust tube 40 is sealed by engagement of the threads 44 with the corresponding threads provided in tube 40. A small amount of liquid material to be tested is placed in the capillary specimen tube 19, this tube together with its assembly 48 is screw threaded into tube 49 and electrical connections are made to the plug 67. Thereupon, the cup member 101 is moved upwardly until the member 109 engages and seals the lower part of the sleeve 89 thereby defining the subchamber 88 surrounding the specimen holder.

The tube 49 is removed from the frustro-conical portion 90 and cooling fluid is introduced through the openings 97, said fluid flowing downwardly into the subchamber 88. The specimen holder 49 is inserted when boiling in the Dewar-type flask has stopped. In this manner, the specimen is very rapidly cooled and frozen into a suitable state for X-ray examination. Thereupon, the tube 49 is lowered so that the portion 52 of assembly 48 is moved into sealing engagement with the frustro-conical portion 90 thereby completely closing and sealing the subchamber 88. At this time, a portion of the cooling fluid is disposed in the subchamber 88 and an additional portion is disposed in the interspace between the flask portion 99 and tube 49 which maintains the portion of the tube adjacent the specimen holder at an extremely low temperature. When the specimen has been cooled to the desired extent, excess liquid may be drained off through needle valve 114 or, if the cooling fluid utilized is liquid nitrogen, the pressure within the subchamber 88 may rise to such an extent that the needle valve is automatically actuated. During this period, the temperature of the specimen may be observed by means of the thermocouple 55, Figure 3, in the specimen holder assembly and temperature adjustments may be made by actuating the heater coil 57. It will be apparent that, during this period, the member 109 and cup shaped member 101 obstruct the path of the X-ray beam between the slit assembly, the specimen, the beam stop, and the film.

When the specimen reaches the desired temperature, the cup member 101 is lowered and the parts 101, 109 are thereby moved out of the path of the X-ray beam allowing the sample to be irradiated with X-rays and a diffraction pattern to be impressed upon the photographic film 20. During this period, the motor 76 is actuated, causing the specimen holder 19 to rotate while the film is being exposed. Any cooling fluid remaining in the subchamber 88, of course, has diffused into the main chamber 10 and is removed through the suction line while a vacuum is being produced in the camera body.

After the film has been exposed, the valve mechanism at 41 is actuated to admit air into the chamber and to force cap 43 into engagement with the end of tube 40. Thereupon, the suction line may be removed without the danger of light entering the chamber. The apparatus may then be taken into a darkroom for removal of the film.

It will be apparent that the described apparatus offers a number of important advantages. Thus, the cooling fluid is utilized only in a limited area surrounding the specimen, this area being defined by the subchamber 88, and it is not necessary to cool the whole interior of the main X-ray chamber 10. Further, the apparatus of our invention provides a clear unobstructed path for the X-ray beam after the specimen has been cooled to the desired temperature and the apparatus for accomplishing this result is completely sealed so that there is no interference with the X-ray diffraction pattern. The use of the subchamber 88 enables specimens to be very quickly frozen so that crystals may be obtained of such small size as to be very desirable for X-ray examination. The provision of the heater and thermocouple adjacent the specimen holder provides a very accurate and close control of specimen temperature over a range of temperatures which is desirable in order to study phase transitions, or the coefficient of expansion of various materials. Finally, the construction is such that the desirable rotary movement of the specimen holder is obtained while the film is being exposed thereby providing a reinforced and clearer diffraction pattern of the material to be obtained.

The present apparatus has been advantageously employed for obtaining diffraction patterns of frozen hydrocarbons and hydrocarbon mixtures. The apparatus is also applicable to many polymers and organic materials, particularly rubber, which give poor diffraction patterns at ordinary temperatures. The diffraction patterns obtained with our present apparatus with such materials are very clear and more sharply defined than has heretofore been possible.

While the invention has been described in connection with a present, preferred embodiment thereof, it is to be understood that this description is illustrative only and is not intended to limit the invention, the scope of which is defined by the appended claims.

What is claimed as new and desired to be secured by Letters Patent is:

1. In X-ray diffraction apparatus, an X-ray chamber, means for evacuating and hermetically sealing said chamber, a support for a film and a specimen holder in said chamber, a guide for directing a beam of X-rays against said specimen holder for diffraction against said film support, means defining a subchamber surrounding and completely enclosing said specimen holder, and means for introducing cooling fluid into said subchamber.

2. In X-ray diffraction apparatus, an X-ray chamber including a specimen holder, a support for a film, and means for directing a beam of X-rays against a specimen in said holder thereby to produce a diffraction pattern upon a film in said support, means for evacuating and hermetically sealing said chamber, a pair of relatively movable members which are engageable to define a sealed coolant chamber within said X-ray chamber and surrounding said specimen holder, and means for introducing cooling fluid into said coolant chamber.

3. In X-ray diffraction apparatus, an X-ray chamber including a specimen holder, a support for a film, a slit assembly for directing a beam of X-rays against a specimen in said holder thereby to produce a diffraction pattern upon a film in said support, means for evacuating and hermetically sealing said chamber, a pair of relatively movable members which are engageable to define a sealed coolant chamber within said X-ray chamber and surrounding said specimen holder, said members, in their engaged position, obstructing the path of the X-ray beam between said slit assembly and said specimen, means for introducing cooling fluid into said coolant chamber, and means for moving said members to a spaced position to provide an unobstructed path between said slit assembly and said specimen holder.

4. In X-ray diffraction apparatus, an X-ray chamber including a specimen holder comprising a beryllium tube of capillary dimensions having a quantity of liquid test material therein, a support for a film, and means for directing a beam of X-rays against said tube thereby to produce a diffraction pattern upon a film in said support, means for evacuating and hermetically sealing said chamber, a pair of relatively movable sealing members which are engageable to define a coolant chamber within said X-ray chamber surrounding said tube, said sealing members, in their engaged position, obstructing the path of the X-ray beam between said slit assembly and said tube, means for moving said members to a spaced position to provide an unobstructed path between said slit assembly and said tube, and means for introducing cooling fluid into said coolant chamber thereby to freeze the liquid in said tube.

5. In X-ray diffraction apparatus, an X-ray chamber including a rotatable specimen holder, a support for a film, and guide means for directing a beam of X-rays against a specimen in said holder thereby to produce a diffraction pattern upon a film in said support, means for evacuating and hermetically sealing said chamber, a pair of relatively movable sealing members which are engageable to define a coolant chamber within said X-ray chamber surrounding said specimen holder, one of said members including a needle valve communicating with the coolant chamber to relieve excessive fluid pressures therein, said members, in their engaged position, obstructing the path of the X-ray beam between said guide means and said specimen, means for introducing cooling fluid into said coolant chamber when said members are in their engaged position, and means for moving said members to a spaced position to provide an unobstructed path between said guide means and said specimen holder.

6. In X-ray diffraction apparatus, a chamber having an arcuate interior portion which is adapted to receive a film, means for evacuating and hermetically sealing said chamber, a beam stop in said chamber, a slit assembly for directing a beam of X-rays against said stop, a specimen holder assembly mounted for rotary movement relative to said chamber and having a sleeve portion protruding into said chamber, a carrier included in said assembly which is movable axially of said sleeve portion into and out of sealing engagement therewith, a specimen holder supported by said carrier and movable therewith to a position between said slit assembly and said stop thereby to deflect a part of the X-ray beam onto the arcuate portion of said chamber, a cup shaped member in said chamber which is movable axially into sealing engagement with said sleeve portion thereby defining a subchamber surrounding said specimen holder, means for moving said carrier out of engagement with said sleeve portion to permit introduction of cooling fluid into said subchamber thereby to freeze a specimen in said holder and for moving said carrier into sealing engagement with said sleeve portion after sufficient fluid has entered the subchamber, and means for moving said cup shaped member to a position spaced from said sleeve member to provide an unobstructed path for the X-ray beam between said slit assembly and said specimen holder.

7. In X-ray diffraction apparatus, a chamber having an arcuate interior portion which is adapted to receive a film, means for evacuating and hermetically sealing said chamber, a beam stop in said chamber, a slit assembly for directing a beam of X-rays against said stop, a specimen holder assembly mounted for rotary movement relative to said chamber, said assembly including a sleeve protruding into said chamber having a frustro-conical inner portion, a carrier forming a part of said assembly which is movable axially of said sleeve portion into and out of sealing engagement with said frustro-conical portion, a specimen holder supported by said carrier and movable therewith to a position between said slit assembly and said stop thereby to diffract a part of the X-ray beam onto a film held by the arcuate portion of said chamber, a member in said chamber which is movable axially into sealing engagement with said sleeve thereby defining a subchamber surrounding said specimen holder, said member obstructing the path of the X-ray beam when it is in such engaged position, means for moving said carrier out of engagement with said frustro-conical portion to permit introduction of cooling fluid into said subchamber thereby to freeze a specimen in said holder and for moving said carrier into sealing engagement with said sleeve portion after sufficient cooling fluid has entered the subchamber, and means for moving said cup shaped member to a position spaced from said sleeve to provide an unobstructed path for the X-ray beam between said slit assembly and said specimen holder.

8. A cooling chamber assembly for quick freezing of a specimen to be subjected to crystallographic X-ray analysis which comprises a rotatable specimen holder assembly including a sleeve, a tubular member axially movable relative to said sleeve, a specimen holder assembly secured to said tubular member and adapted for sealing engagement with said sleeve, a second assembly including a support, a member axially movable on said support and adapted for sealing engagement with said sleeve to define a cooling chamber surrounding said specimen holder assembly, whereby cooling fluid may be supplied to said chamber through the interspace between said tubular member and said sleeve to quickly freeze a specimen in said holder assembly.

9. A cooling chamber assembly for quick freezing of a specimen to be subjected to crystallographic X-ray analysis which comprises a rotatable specimen holder assembly including a sleeve having a frustro-conical portion, a tubular member axially movable relative to said sleeve, a specimen holder assembly secured to said tubular member and adapted for sealing engagement with said frustro-conical portion, and heat insulating means closely spaced with respect to the outer surface of said tubular member, a second assembly including a support, a generally cup shaped member threaded to said support and axially movable thereon, said cup shaped member being adapted for sealing engagement with said sleeve to define a cooling chamber surrounding said specimen holder, whereby cooling fluid may be supplied to said chamber and to the interspace between said tubular member and said heat insulating means thereby to quickly freeze a specimen in said holder assembly, and a bellows secured to said support and said cup shaped member to seal the threaded joint therebetween.

KARL E. BEU.
HOWARD H. CLAASSEN.

REFERENCES CITED

The following references are of record in the file of this patent:

UNITED STATES PATENTS

| Number | Name | Date |
| --- | --- | --- |
| 1,904,392 | Stintzing et al. | Apr. 18, 1933 |
| 2,341,108 | McLachlan, Jr. | Feb. 8, 1944 |

OTHER REFERENCES

Page 137, Journal of Applied Physics, vol. 14, Mar. 1943.

A Variable Temperature X-ray Powder Camera by W. H. Barnes and W. F. Hampton, Review of Scientific Instruments, Nov. 1935, pp. 342–344.

An X-ray Camera for Powder Diagrams at any Temperature by N. W. Taylor, Review Scientific Instruments, Nov. 1931, pp. 751–755.

X-ray Studies of the Thermal Expansion of Bismuth Single Crystals by Goetz et al., Physical Review, June 1932, pp. 645–646.

A High-Temperature X-ray Camera for Precision Measurements by A. H. Jay, Physical Society of London Proceedings, vol. 45, 1933, pp. 635–642.